US011125397B2

(12) United States Patent
Bryan (10) Patent No.: US 11,125,397 B2
(45) Date of Patent: Sep. 21, 2021

(54) OPTICAL SYSTEM FOR LINEAR LIGHTING

(71) Applicant: Elemental LED, Inc., Reno, NV (US)

(72) Inventor: Raymond G. Bryan, Reno, NV (US)

(73) Assignee: Elemental LED, Inc., Reno, NV (US)

(*) Notice: Subject to any disclaimer, the term of this patent is extended or adjusted under 35 U.S.C. 154(b) by 0 days.

(21) Appl. No.: 17/123,895

(22) Filed: Dec. 16, 2020

(65) Prior Publication Data

US 2021/0148526 A1 May 20, 2021

Related U.S. Application Data

(63) Continuation of application No. 16/688,948, filed on Nov. 19, 2019, now Pat. No. 10,920,940.

(51) Int. Cl.
| | |
|---|---|
| *F21K 9/69* | (2016.01) |
| *F21V 5/04* | (2006.01) |
| *F21V 3/06* | (2018.01) |
| *G02B 5/02* | (2006.01) |
| *F21S 4/28* | (2016.01) |

(52) U.S. Cl.
CPC ............... *F21K 9/69* (2016.08); *F21S 4/28* (2016.01); *F21V 3/0625* (2018.02); *F21V 5/04* (2013.01); *G02B 5/021* (2013.01); *G02B 5/0278* (2013.01)

(58) Field of Classification Search
CPC ... F21K 9/69; F21K 9/27; F21V 7/043; F21V 5/04; F21V 5/008; F21S 4/28
See application file for complete search history.

(56) References Cited

U.S. PATENT DOCUMENTS

| | | |
|---|---|---|
| 6,561,690 B2 | 5/2003 | Balestriero et al. |
| 6,758,582 B1 | 7/2004 | Hsiao et al. |
| 7,070,310 B2 | 7/2006 | Pond et al. |
| 7,857,482 B2 | 12/2010 | Reo et al. |
| 7,926,985 B2 | 4/2011 | Teng et al. |

(Continued)

FOREIGN PATENT DOCUMENTS

| | | | | |
|---|---|---|---|---|
| EP | 2865939 A1 | * | 4/2015 | ............ F21V 17/002 |
| KR | 101071859 B1 | | 10/2011 | |
| WO | 2016099514 A1 | | 6/2016 | |

OTHER PUBLICATIONS

International Search Report issued in International Application No. PCT/US2020/042519 dated Nov. 6, 2020.

(Continued)

*Primary Examiner* — Julie A Bannan
(74) *Attorney, Agent, or Firm* — United IP Counselors, LLC (57) ABSTRACT

Optical systems for linear lighting, particularly linear lighting that is installed in a channel, are disclosed, as are light fixtures that use these optical systems. The optical systems have multiple lenses, usually a first lens adapted to be positioned close to a strip of linear lighting installed in a channel, and a second lens adapted to be positioned farther from the strip of linear lighting. The two lenses are optically aligned with one another such that light from the first lens reaches the second lens. The two lenses may, e.g., form an Abbe condenser lens system. In some embodiments, diffusing features may be integrated into one or both lenses to effect light mixing. The multiple lenses may be adapted to physically support one another, and to engage with structure provided by the channel for securing a cover.

16 Claims, 6 Drawing Sheets

(56) References Cited

U.S. PATENT DOCUMENTS

| | | | |
|---|---|---|---|
| 8,070,329 B1* | 12/2011 | Bechtel | F21V 5/008 |
| | | | 362/331 |
| 8,436,375 B2* | 5/2013 | Miura | F21V 17/005 |
| | | | 257/91 |
| 8,616,723 B2 | 12/2013 | Zhang et al. | |
| 8,998,448 B2 | 4/2015 | Chang | |
| 9,065,991 B2 | 6/2015 | Galstian et al. | |
| 9,719,662 B1* | 8/2017 | Householder | F21V 13/12 |
| 10,078,180 B1 | 9/2018 | Wasserman et al. | |
| 2006/0256563 A1 | 11/2006 | Uke et al. | |
| 2009/0128738 A1 | 5/2009 | Matsumoto et al. | |
| 2009/0207586 A1 | 8/2009 | Arai et al. | |
| 2010/0277908 A1 | 11/2010 | Hu et al. | |
| 2012/0051039 A1 | 3/2012 | Chang | |
| 2012/0160642 A1 | 6/2012 | Liao | |
| 2013/0094200 A1 | 4/2013 | Dellian et al. | |
| 2013/0208473 A1 | 8/2013 | Palagashvili et al. | |
| 2014/0092596 A1* | 4/2014 | Deutsch | H05K 1/142 |
| | | | 362/236 |
| 2016/0076706 A1 | 3/2016 | Rebman et al. | |
| 2016/0238202 A1 | 8/2016 | Mallory et al. | |
| 2016/0377257 A1* | 12/2016 | Xu | F21V 5/08 |
| | | | 362/224 |
| 2017/0276323 A1 | 9/2017 | Umeda et al. | |
| 2018/0045387 A1 | 2/2018 | Roach et al. | |
| 2018/0245754 A1 | 8/2018 | Gensler et al. | |

OTHER PUBLICATIONS

Written Opinion issued in International Application No. PCT/US2020/042519 dated Nov. 6, 2020.

* cited by examiner

OPTICAL SYSTEM FOR LINEAR LIGHTING

CROSS-REFERENCE TO RELATED APPLICATIONS

This application is a continuation of U.S. patent application Ser. No. 16/688,948, filed Nov. 19, 2019, the contents of which are incorporated by reference herein in their entirety.

TECHNICAL FIELD

The invention relates to optical systems for linear lighting.

BACKGROUND

Linear lighting is a class of lighting based on light-emitting diodes (LEDs). A strip of linear lighting includes a printed circuit board (PCB) on which are mounted a number of LED light engines, typically mounted at a regular pitch or interval along the PCB. The PCB in question may be rigid or flexible. By joining strips of PCB end-to-end, linear lighting may be made in arbitrary lengths.

Combined with an appropriate driver, linear lighting is used as a luminaire in its own right, as well as a raw material for the manufacture of other types of LED-based luminaires. One common way to make a finished luminaire is to mount a strip of linear lighting in a channel and cover it with a cover. The channel provides protection for the strip of linear lighting, and the cover may produce a range of desired lighting effects, ranging from direction to diffusion.

An LED light engine, as the term is used here, refers to one or more LEDs in a package. The package allows the light engine to be mounted on a PCB by a common technique, such as surface mounting. Depending on the nature of the light that is to be emitted, the package may be topped with a phosphor that absorbs the light emitted by the LEDs and re-emits that light in a desirable color or spectrum. In a typical commercial LED light engine intended to emit "white" light, the LEDs in question are blue-emitting LEDs, and the phosphor absorbs blue light and emits a broader spectrum of light that appears to the observer to be white light. The re-emitted light is not usually of a single color; in fact, the typical spectral power distribution of the light spans the visible light spectrum.

Most LED light engines have a natural beam width in the range of about 120°-130°, full-width, half-maximum. However, that beam width is not suitable for all applications, nor are the other natural or typical light-emitting characteristics of linear lighting. Despite the ubiquity of LED lighting in the market, systems for controlling the light output of LED linear lighting are still rudimentary.

SUMMARY OF THE INVENTION

Aspects of the invention relate to optical systems for linear lighting, particularly linear lighting that is installed in a channel. These optical systems have multiple lenses, usually a first lens adapted to be positioned close to a strip of linear lighting installed in a channel, and a second lens adapted to be positioned farther from the strip of linear lighting. The two lenses are optically aligned with one another such that light from the first lens reaches the second lens. In optical terms, the first lens fills the aperture of the second lens.

The nature of the two lenses may vary from embodiment to embodiment. The first lens may be plano-convex, for example, while the second lens may be bi-convex. Two lenses may, e.g., form an Abbe condenser. In other embodiments, the first lens may be bi-concave while the second lens is bi-convex. In addition to their refractive properties, either or both of the two lenses may include diffusing properties, in order to mix light. For example, one surface of the first lens may have diffusing properties in order to mix light as close to the source as possible.

Physically, the first lens may be supported by feet or other such support structure that rest on the bottom of the channel, such that the first lens is just above the linear lighting. For example, the first lens may have an optically-active portion that is integrated into a platform. The platform may support the second lens, at least in part. The second lens itself may have depending legs that rest on the platform. Thus, the lenses of a multiple-lens system may be arranged so that they are supported in part by each other and in part by the cover-securing structure of the channel.

As another example, the first lens may be integrated into a platform that has laterally-extending, upswept wings that partially engage the cover-securing structure of the channel and at least partially support the second lens.

Yet another aspect of the invention relates to light fixtures and luminaires. These light fixtures and luminaires typically include a channel, a strip of linear lighting installed in the channel, and an optical system of the kind described above.

Other aspects, features, and advantages of the invention will be set forth in the following description.

DETAILED DESCRIPTION

Figure 1:
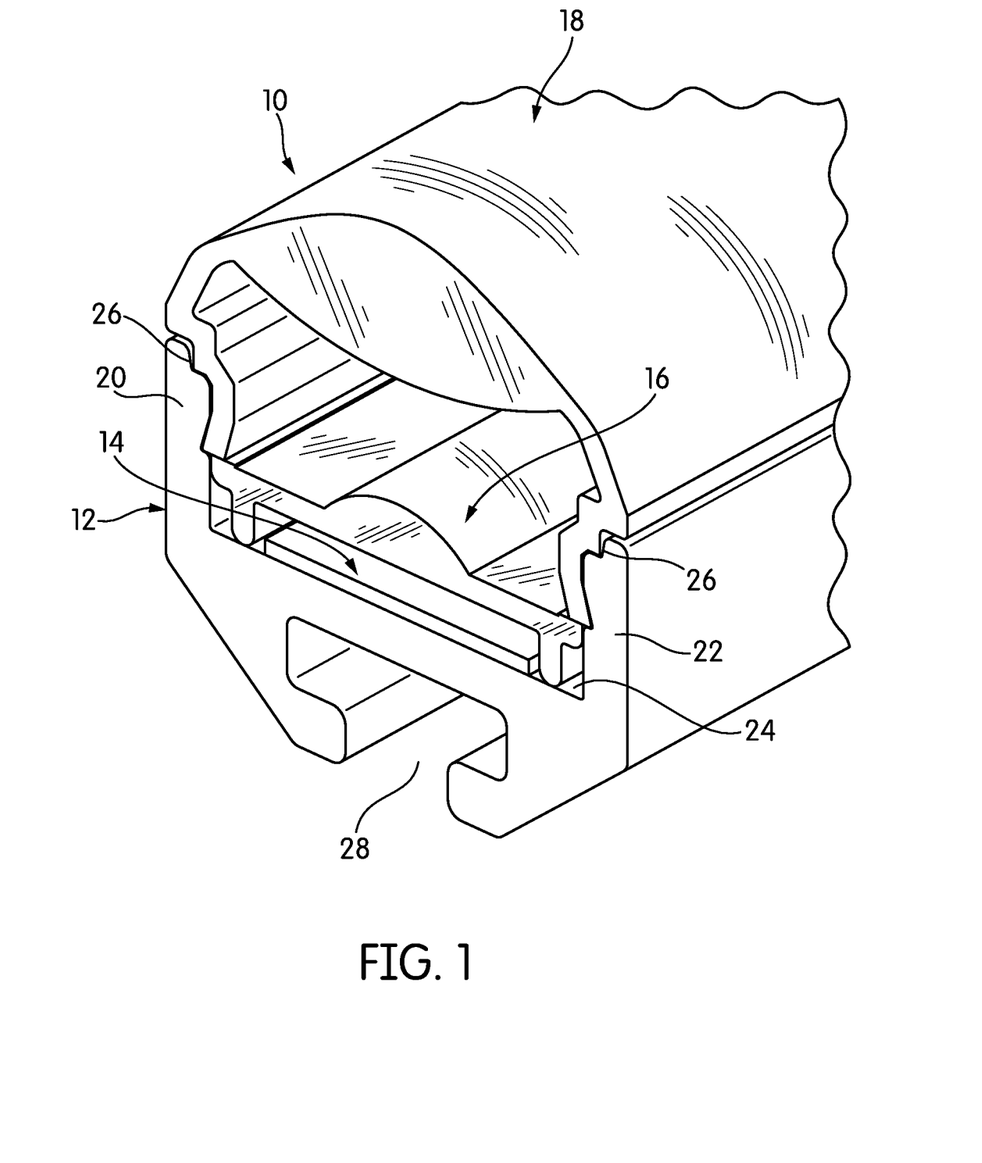
FIG. 1 is a perspective view of an optical system for linear lighting, shown as installed in a channel with a strip of linear lighting.

FIG. 1 is a perspective view of an optical system for linear lighting, generally indicated at 10, shown as installed in a channel 12 with a strip of linear lighting 14. In the illustrated embodiment, the optical system 10 comprises a first lens 16 and a second lens 18.

The term "lens" typically refers to a transparent structure with two opposite surfaces, at least one of which is curved, that is used to refract light. That basic definition of "lens" applies in this description. However, as will be described below in more detail, the first lens 16 and the second lens 18, as well as other lenses according to embodiments of the invention, include additional structure that is not optically active, i.e., it is not used to refract light. Thus, the lenses described here have optically active and non-optically active portions, and the term "lens" should be read as a general term that encompasses both portions, unless one or the other is specified. Additionally, as will be described in more detail below, in some embodiments, one or both lenses may not be transparent.

The optical system 10 is designed to be mounted into and to be used with traditional linear lighting channels. These channels are typically extrusions, and they may be either metal or plastic. They usually include at least some kind of internal features to engage a cover, and may include specific structures to facilitate mounting of the channel on an external surface or mount. The channel 12 of FIG. 1 is the SQUARE™ channel sold by Elemental LED, Inc. of Reno, Nev., United States. More specifically, the channel 12 is an anodized aluminum extrusion in which first and second vertical sidewalls 20, 22 are spaced apart by a bottom 24 to form an open upper compartment. The linear lighting 14 is installed on the bottom 24, typically with pressure-sensitive adhesive preinstalled on its underside, although a separate strip of pressure-sensitive adhesive may be installed in some cases between the bottom 24 and the linear lighting 14 if the linear lighting 14 is not already provided with adhesive. The linear lighting 14 is horizontally centered on the bottom 24 in the view of FIG. 1, although other positions are possible. Upper interior edges of the sidewalls 20, 22 carry engaging structure 26, which is typically used for engaging a cover. The channel 12 of FIG. 1 also includes a lower compartment, in the form of a T-slot 28 that is under and opposite the bottom 24 of the upper compartment. The T-slot 28 is provided to allow the channel 12 to mount to an external mount. Of course, the arrangement of the channel 12 may vary from embodiment to embodiment.

Figure 2:
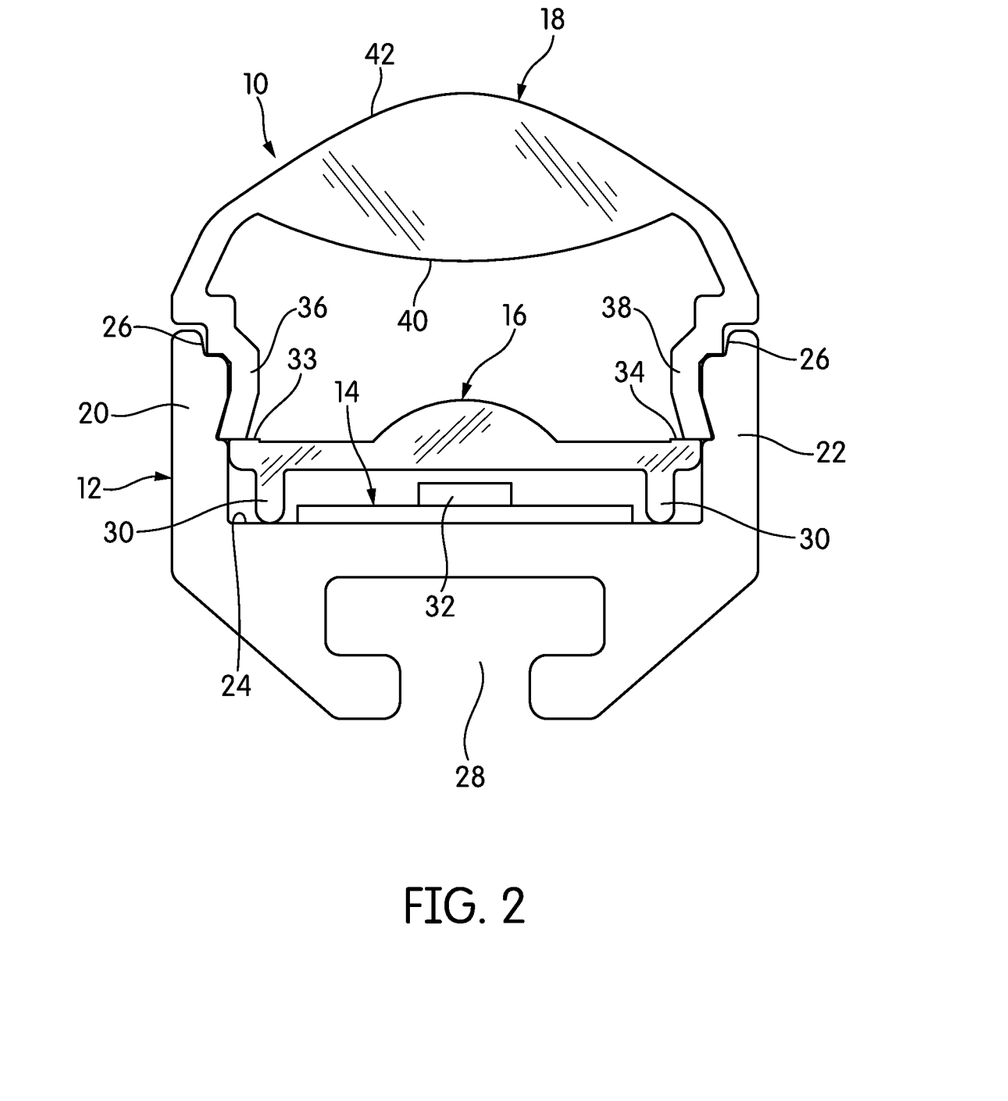
FIG. 2 is an end elevational view of the optical system of FIG. 1.

As is shown in FIG. 1 and in the end-elevational view of FIG. 2, in the optical system 10, the first lens 16 sits on the bottom 24 using two continuous, depending feet 30 that contact the bottom 24 proximate to the two sidewalls 20, 22. The first lens 16 is wider than the linear lighting 14 and is positioned such that the feet 30 rest to the left and right of the linear lighting 14 itself. The feet 30 of the illustrated embodiment have rounded bottoms, although in other embodiments, the feet 30 may be squared-off at their bottoms. Essentially, the optically-active portion of the first lens 16 is integrated into a platform that is suspended above the linear lighting 14. As will be set forth below in greater detail, the first lens 16 is preferably at close proximity to the linear lighting, while the second lens 18 is preferably spaced from it.

In addition to providing a lens directly over the LED light engines 32 of the linear lighting 14, the upper left and right extents of the first lens 16 provide platforms 33, 34 by which the second lens 18 is at least partially supported. Specifically, in the illustrated embodiment, the second lens 18 has leg portions 36, 38 that are canted outwardly and have squared-off bottoms. As shown, the bottoms of the leg portions 36, 38 rest partially in the engaging structures 26 provided by the channel 12 and partially on the platforms 33, 34 provided by the first lens 16. In the illustrated embodiment, the platforms 33, 34 are simply level, slightly raised plateaus on the upper side of the first lens 16; however, the first lens 16 and the leg portions 36, 38 of the second lens 18 may define complementary interlocking or engaging structures in some embodiments. The leg portions 36, 38 may include dark colorant or other such additives in order to prevent light from escaping. In some cases, the leg portions 36, 38 may be co-extruded with the optically-active portion of the second lens 18, so that they can be formed of a different material, or a material with light-blocking colorant.

The channel 12—and most channels of its type—are designed for only a single cover or lens that engages the channel 12 at the tops of the sidewalls 20, 22. One particular advantage of the optical system 10 is that it allows the channel 12 to accommodate and use two lenses 16, 18. Simply put, the use of two lenses allows for more control over the light emitted by the linear lighting 14 with a lower profile for the finished product—that is, because of the first lens 16, the second lens 18 need not be as far away from the linear lighting 14. Additionally, the features of the optical system 10, and particularly the way in which the first lens 16 supports the second lens 18, allow the optical system 10 to be retrofit to a variety of existing channels without requiring the channels 12, which are typically the more expensive components, to be redesigned.

Figure 3:
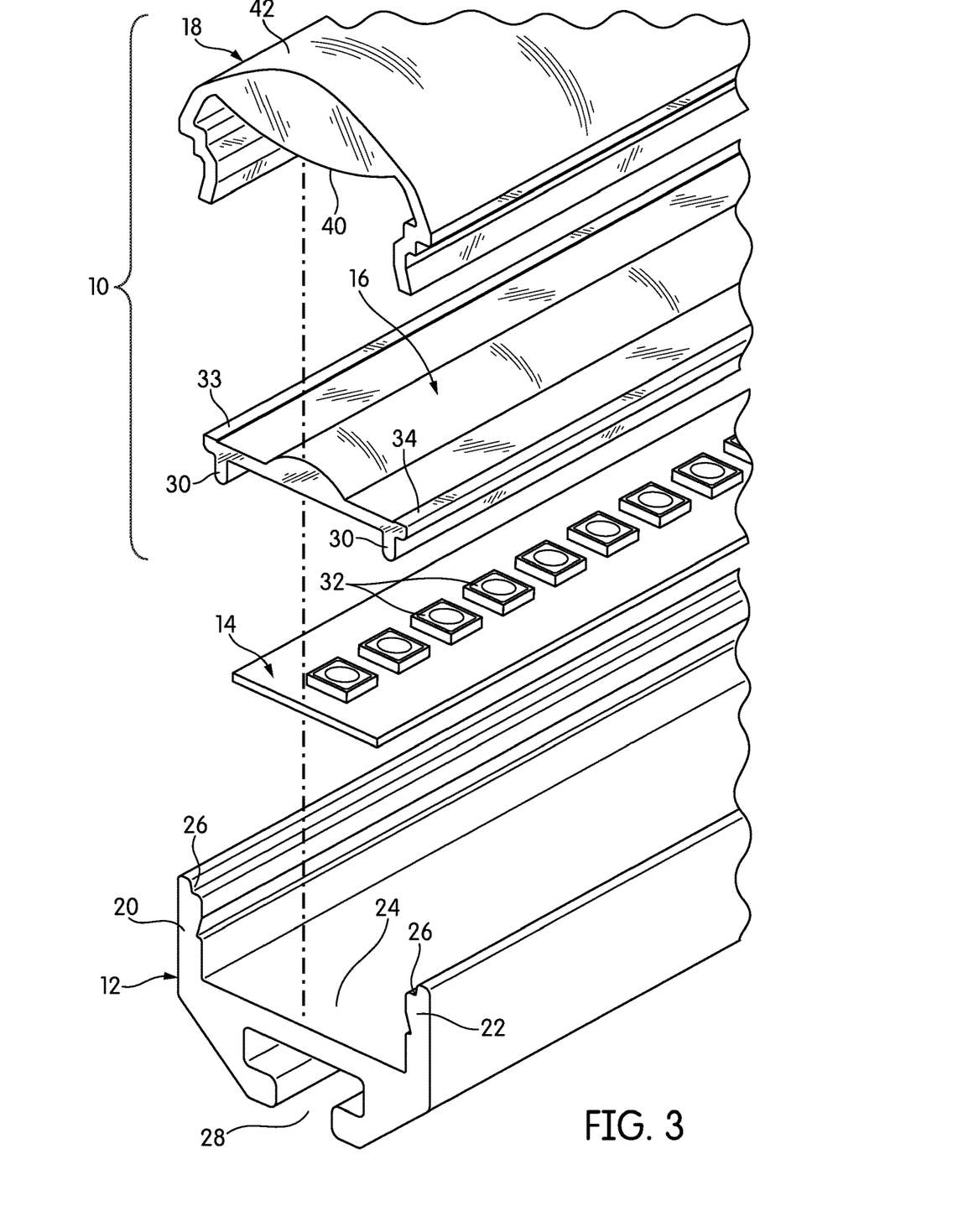
FIG. 3 is an exploded perspective view of the optical system of FIG. 1.

FIG. 3, an exploded perspective view, illustrates the arrangement: the linear lighting 14 is installed on the bottom 24 of the channel, typically horizontally centered. The feet 30 of the first lens 14 rest on the bottom 24, placing the first lens 14 itself over the linear lighting 14 and a short distance it. The second lens 18, which also acts to cover the channel 12, rests on the first lens 14 as well as engaging the structure 26 of the channel 12.

The materials of which the lenses 16, 18 are made may vary from embodiment to embodiment. Any material that has a refractive index higher than that of air and that is flexible enough to mount in the channel 12 may be used. Typically, the lenses 16, 18 will be made of a plastic, like polycarbonate, poly(methyl methacrylate), thiourethane, or the like. Plastic materials may include various modifiers, including impact-strength modifiers. For example, an impact-modified acrylic such as CA-924 (Plaskolite, Inc., Columbus, Ohio, United States) may be used.

Typically, the lens material will have a refractive index of at least 1.4, and may have a refractive index of 1.6-1.7 or higher if a high-index optical lens plastic is used. The lenses 16, 18 will typically be extruded in lengths of several feet or meters, but shorter sections may be cast or injection molded, for example, instead of being extruded. Optical systems 10 according to embodiments of the invention may be used in channels that are designed for immersive use in water or other liquids, but in that case, in addition to the ingress protection considerations, the materials of the optical system 10 should have higher indices of refraction than that of water or the liquid in which the system 10 is to be immersed. It should be understood that while the first lens 16 and the second lens 18 will often be made of the same material, they need not be.

The purpose of optical systems 10 according to embodiments of the invention will vary from embodiment to embodiment. In some embodiments, the optical system 10 may widen the beam of emitted light; in other embodiments, the optical system 10 may narrow the beam of emitted light. In yet other embodiments, the optical system 10 may have other purposes altogether.

In the illustrated embodiment, the first lens 16 and the second lens 18 are essentially an Abbe condenser system. Specifically, the first lens 16 is a plano-convex lens, and the second lens is a biconvex lens. Essentially, the first lens 16 fills the aperture of the second lens 18, i.e., the optically-active portions of the two lenses 16, 18 are optically aligned such that light from the first lens 16 is received by the second lens 18. The purpose of the optical system 10 is to produce a narrower light beam. In some cases, the non-optically-active portions of the two lenses 16, 18 may be dyed or otherwise darkened so that less light escapes the optical system 10.

In one embodiment, the optically active portion of the first lens 16 has a width of 6.6 mm, a thickness of 1.4 mm, and a radius of curvature of 4.4 mm. The second lens 18 has a maximum thickness of 6 mm. In the second lens 18, the inner surface 40 of the optically active portion is spherical with a radius of curvature of 17 mm; the outer surface 42 is non-spherical, defined by Equation (1) below:

$$z = \frac{-0.165x^2}{\sqrt{1 + 0.0408375x^2}} \quad (1)$$

The optical system 10 as a whole has a numerical aperture of 0.8. The first lens 16 essentially fills the aperture of the second lens 18.

Figure 4:
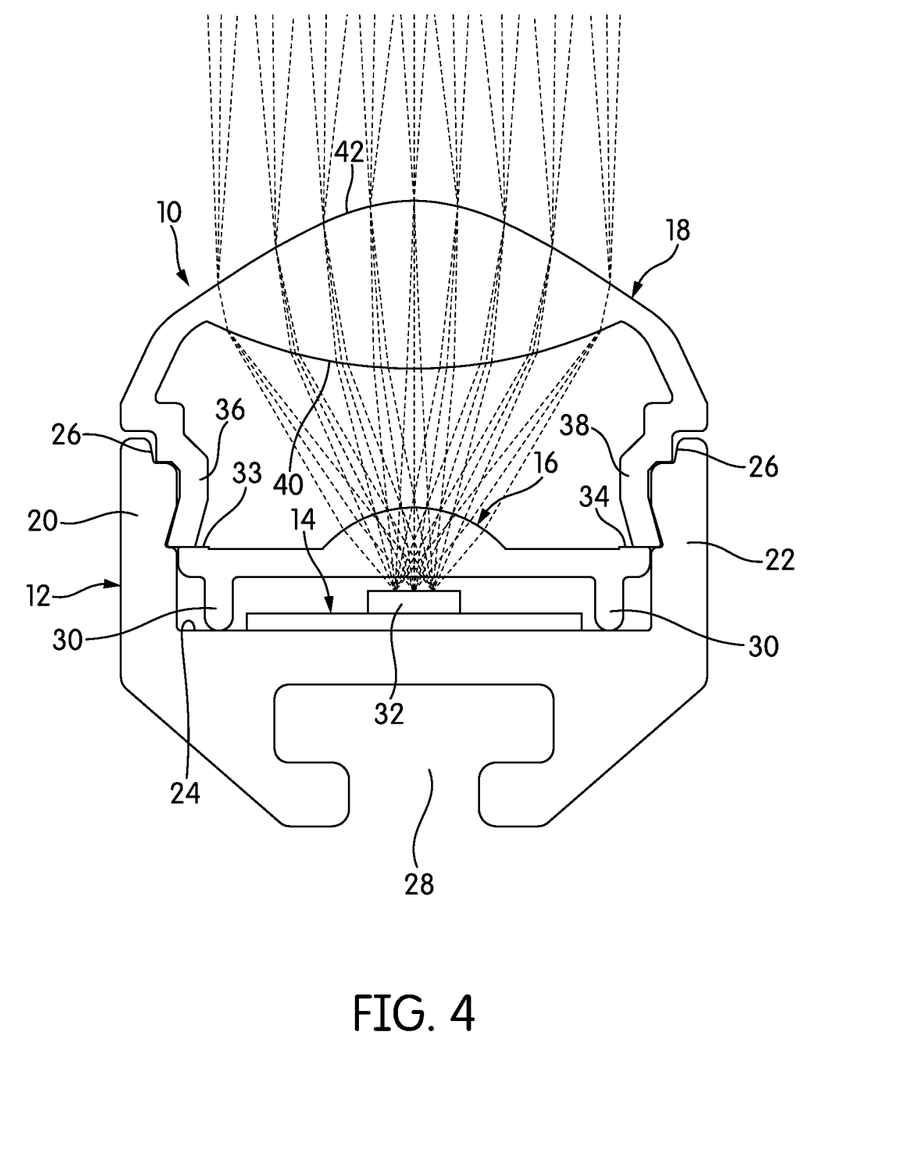
FIG. 4 is an end elevational view similar to the view of FIG. 2, illustrating an optical ray trace for the system.

FIG. 4 is a side elevational view of the optical system 10 and channel 12 with a ray trace overlaid, illustrating the disposition of light rays emitted by the linear lighting 32. Overall, this particular optical system 10 produces a narrower light beam from the linear lighting 32. For example, the optical system may produce a beam angle of 10°, full-width, half-maximum. As shown in FIG. 4, the first lens 16 collects the emitted light; the second lens collimates it.

Beam angles are specified in many different ways. Beam angles for purposes of this description refer to full-width, half-maximum beam widths. "Full-width" means that the full width of the beam is measured, e.g., a 10° beam extends 5° on either side of the centerline. "Half-maximum" means that the intensity of the beam at each of the edges is half of the maximum intensity of the beam.

Figure 5:
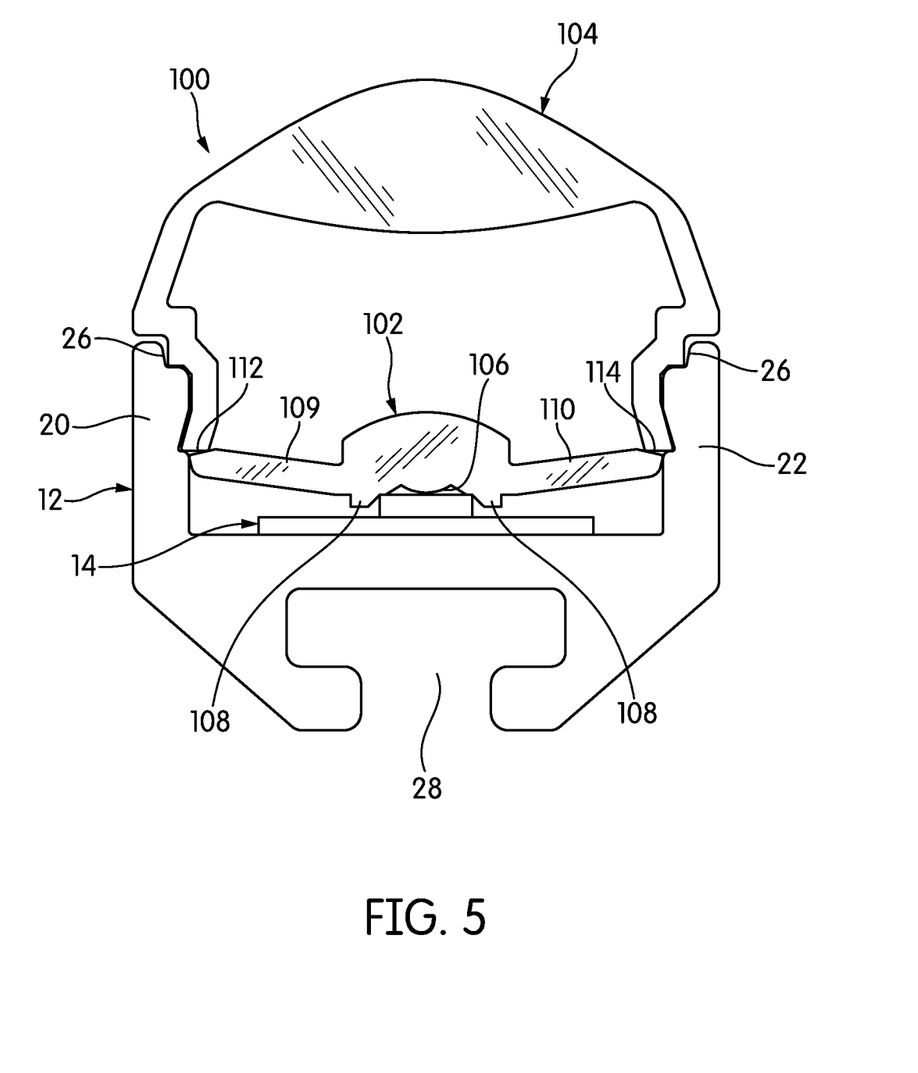
FIG. 5 is an end elevational view of an optical system according to another embodiment of the invention.

FIG. 5 is an end elevational view of an optical system, generally indicated at 100, according to another embodiment of the invention. The optical system 100 rests in a channel 12 that may be assumed to be the same as that described above overtop linear lighting 14. In the view of FIG. 5, the optical system 100 includes a first lens 102 close to the linear lighting 14 and a second lens 104 more removed from the linear lighting 14. The second lens 104 may be considered to be identical to the second lens 18 of the optical system 10 described above.

In contrast to the optical system 10 described above, the first lens 102 of the optical system 100 is a biconvex lens that rests directly on the light engines 32. The lower surface 106 of the first lens 102 is sized specifically for the emitting area of the light engines 32. A pair of flat feet 108 may rest on the linear lighting 14 immediately adjacent to the light engines 32. The biconvex first lens 102 in essence tries to fill the aperture of the second lens 104 with the emitted light from the center of each LED light engine. Light rays emitted closer to the edge of each light engine are refracted inwardly. As will be explained below in more detail, this may have some effect on color mixing.

The first lens 102 engages with the second lens 104 and the channel 12 slightly differently than the first lens 16 described above. Left and right wings 109, 110 extend outward from the center lens portion of the first lens 102, toward the sidewalls 20, 22 of the channel 26. Canted slightly upward, the wings 109, 110 provide platforms 112, 114 that partially support the legs 36, 38 of the second lens 104.

In the embodiments described above, lenses alone are used to produce the desired beam control and optical effects. As those of skill in the art will realize, there are situations in which it may be useful to modify the light in other ways. For example, the above description assumes that the emitted light is uniform across the light engine 32. However, an actual light engine may emit non-uniformly across its emitting area. In some cases, the variations may be random; in other cases, the variations may be in the form of a gradient or gradients. In general, light engines may experience variations or gradients in both intensity and color. Variations or gradients in color may be especially common when a phosphor is used, and may be particularly noticeable in optical systems that include only lenses—color mixing issues may create noticeable halos in the output light at the second lens.

The biconvex first lens 102 described above, and other such optical solutions, may have some effect on the color gradient issue, although it may not address the problem satisfactorily in all embodiments.

In cases of non-uniform light emission, diffusion may be used to mix the emitted light to ensure more uniformity. "Diffusion" and "diffusing effects," as those terms are used here, refer to the spreading or scattering of transmitted or reflected beams of light, typically by transmission through (and refraction by) a non-uniform medium or refraction at a surface or interface between two dissimilar materials. In a multiple-lens system, like those described here, either or both lenses may have diffusing features, although it may be particularly beneficial if the lens closest to the light has diffusing features, so that the light is mixed as close to the source as possible.

Figure 6:
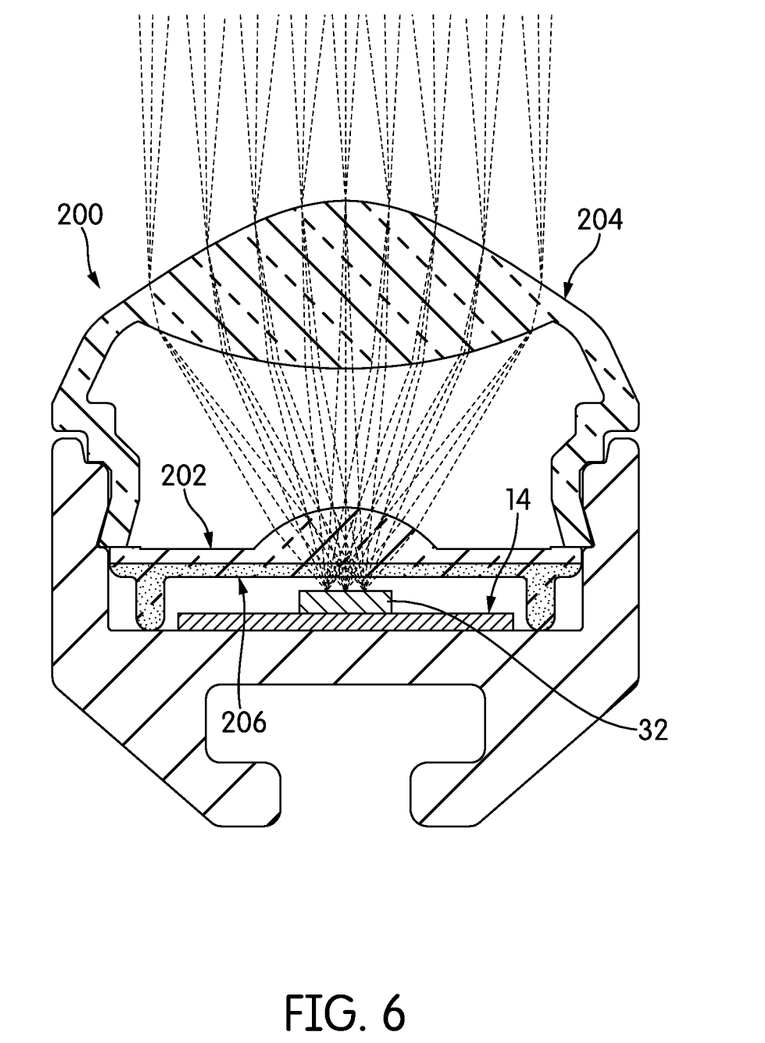
FIG. 6 is an end elevational view of an optical system according to yet another embodiment of the invention, illustrating an optical ray trace for the system.

FIG. 6 is a cross-sectional view of an optical system, generally indicated at 200, that illustrates the use of diffusion. The optical system 200 is generally similar to the optical system 10 described above; therefore, any component not described here may be assumed to be similar to its counterpart above. The optical system 200 includes a first lens 202 and a second lens 204. In the first lens 202, the underside 206 is comprised of a plastic that has one or more diffusing additives in it. Thus, the light from the light engine 32 is diffused immediately as it passes through the first lens 202.

The first lens 202 could, for example, be co-extruded, with the diffusing material and the clear plastic of the lens formed at the same time. Alternately, the diffusing material could be applied in a second process step in the form of a liquid coating which would then be cured on the first lens 202. In yet other cases, the diffuser may be entirely separate from the first lens 202 and the second lens.

Various types of additives are used to create diffusing materials. In simple cases, dyes and colorants are added to plastics like polycarbonate and acrylic in order to create diffusing covers. These types of additives may be used in some embodiments of the invention, and produce their effects primarily through opacity.

However, it may be advantageous to use diffusing additives that produce their effect refractively. They typically have a high index of refraction as compared with the base plastic or other material. For example, silica, fumed silica, or titanium dioxide microspheres in a base material of acrylic or polycarbonate may be particularly suitable in some embodiments.

The optical systems described above may ultimately be used to modify the light output from linear lighting in a variety of ways. Although the embodiments described above narrow or focus the emitted light, other embodiments may modify the light in other ways. It should be understood that while two lenses of specific types are shown and described above, optical systems according to embodiments of the invention may have more than two lenses. If there are more than two lenses, those lenses may be arranged and supported in a variety of ways.

While the invention has been described with respect to certain embodiments, the description is intended to be exemplary, rather than limiting. Modifications and changes may be made within the scope of the invention, which is defined by the appended claims.

What is claimed is:

1. A light fixture, comprising:
    an elongate channel having a bottom and a pair of sidewalls spaced apart along and extending upward from the bottom, upper interior edges of the pair of sidewalls having cover-engaging structure;
    a strip of linear lighting disposed on the bottom;
    an elongate first lens integrated into a platform, the platform having depending feet, the first lens adapted to rest on the bottom of the channel over the strip of linear lighting and act as a diffuser; and
    an elongate second lens adapted to cover the channel and to rest at least in part on the platform of the first lens and at least in part on the cover-engaging structure of the channel so as to be positioned over and optically aligned with the first lens to receive light from the first lens.

2. The light fixture of claim 1, wherein the first lens and the second lens form an Abbe condenser system.

3. The light fixture of claim 2, wherein the first lens is a plano-convex lens.

4. The light fixture of claim 3, wherein the second lens is a biconvex lens.

5. The light fixture of claim 4, wherein at least one surface of the biconvex second lens is non-spherical.

6. The light fixture of claim 1, wherein the second lens acts as a diffuser.

7. The light fixture of claim 1, wherein one side of the first lens is provided with diffusing material.

8. The light fixture of claim 7, wherein the diffusing material comprises a refractive diffusing filler dispersed in a base material.

9. The light fixture of claim 8, wherein the diffusing filler comprises silica or titanium dioxide microspheres.

10. The light fixture of claim 8, wherein the base material comprises acrylic or polycarbonate polymer.

11. A light fixture, comprising:
    an elongate channel having cover-engaging structure at upper ends of sidewalls thereof;
    a strip of linear lighting disposed in the channel;
    an elongate first lens adapted to receive light from the strip of linear lighting, the first lens including a first support depending from the first lens to support the first lens on a bottom of the channel and a second support; and
    an elongate second lens adapted to receive light from the first lens and to be supported, at least in part, on the second support of the first lens;
    the second support of the first lens positioned adjacent the cover-engaging structure of the channel such that depending structure of the second lens rests at least partially on the second support and at least partially on the cover-engaging structure within an interior of the channel.

12. The light fixture of claim 11, further comprising a diffuser.

13. A light fixture, comprising:
    an elongate channel having a pair of sidewalls arising from and spaced apart by a bottom, and cover-engaging structure at upper ends of the sidewalls;
    a strip of linear lighting disposed on the bottom;
    an elongate first lens including a first support adapted to support the first lens along the bottom of the channel and a second support, the first support depending from the first lens; and
    an elongate second lens adapted to cover the channel and including a depending leg with a bottom surface adapted to rest at least partially on the second support and at least partially on the cover-engaging structure;
    the first lens and the second lens are optically aligned such that the second lens receives light from the first lens.

14. The light fixture of claim 1, wherein at least one of the channel, first lens, or second lens has a constant cross-section along its respective length.

15. The light fixture of claim 11, wherein at least one of the channel, first lens, or second lens has a constant cross-section along its respective length.

16. The light fixture of claim 13, wherein at least one of the channel, first lens, or second lens has a constant cross-section along its respective length.

* * * * *